United States Patent [19]

Lindsay

[11] 4,171,649
[45] Oct. 23, 1979

[54] VARIABLE SPEED POWER TRANSMISSION APPARATUS

[76] Inventor: Carlester Lindsay, 3551 Grant St., Corona, Calif. 91720

[21] Appl. No.: 794,848

[22] Filed: May 9, 1977

[51] Int. Cl.² ............................ F16H 1/12; F16H 1/20
[52] U.S. Cl. ........................................ 74/416; 74/417;
74/393; 74/434; 74/462
[58] Field of Search ............... 74/352, 347, 331, 417,
74/462, 434, 438, 416, 194, 393, 342

[56] References Cited

U.S. PATENT DOCUMENTS

| 784,813 | 3/1905 | Spiller | 74/462 |
|---|---|---|---|
| 1,236,789 | 8/1917 | Trussell | 74/434 X |
| 1,833,159 | 11/1931 | Garnett | 74/462 |
| 2,346,507 | 4/1944 | Quinn | 74/416 |
| 2,378,564 | 6/1945 | Ligh | 74/416 |
| 2,430,129 | 11/1947 | Ligh | 74/416 |
| 2,570,720 | 10/1951 | Rumpf | 74/342 |
| 2,960,884 | 11/1960 | Hill | 74/462 |
| 3,180,172 | 4/1965 | Leggatt | 74/462 |
| 3,756,091 | 9/1973 | Miller | 74/462 X |

FOREIGN PATENT DOCUMENTS

1341165 9/1963 France .............................. 74/DIG. 12

*Primary Examiner*—Henry C. Yuen
*Attorney, Agent, or Firm*—John H. Crowe

[57] ABSTRACT

A variable speed and direction power transmission attachment for driving the cutting tool carriage of a lathe or the like, the attachment having sets of intermeshing male and female cog gears. Certain of such sets each comprises a face gear having a plurality of concentric rows of tooth socket elements formed therein. A male cog gear is selectively settable to mesh with any of such rows to change the gear ratio. By changing the combined setting of different sets of gears, a wide variation in overall gear ratio may be obtained to provide many different feeding speeds of the carriage, suitable for general cutting and for screw thread cutting. A reversing mechanism, also constructed of intermeshing cog gears, enables the direction of drive to be reversed or the drive to be disconnected to permit manual drive of the carriage.

15 Claims, 11 Drawing Figures

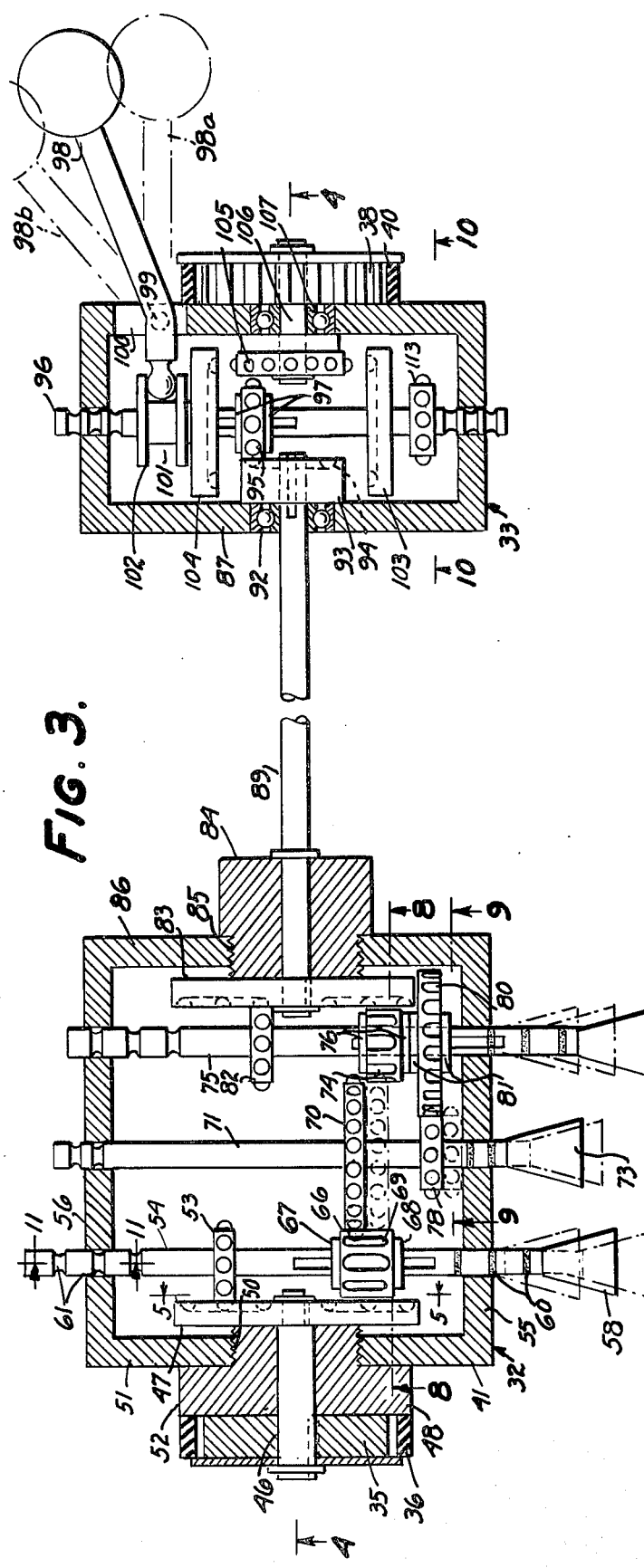

VARIABLE SPEED POWER TRANSMISSION APPARATUS

BACKGROUND OF THE INVENTION

1. Field of the Invention

This invention relates to variable speed power transmission mechanisms and has particular reference to a quick-change variable speed gearing attachment for driving the workpiece cutting tool of a lathe or similar machining apparatus.

2. Description of the Prior Art

Although many lathes incorporate built-in quick-change variable speed gearing devices for power driving a cutting tool relative to a workpiece for both general cutting or for cutting screw thread, many others, particularly those in the small and inexpensive categories such as are used for hobby and model making, do not. Attachments are available which can be mounted on such lathes for screw threading and the like but they generally require special gears and other elements for each rate of feed of the tool carriage. Thus, in order to cut various ores of different screw threads or to move the cutting tool at different rates for general cutting operations, a large number of different gears or other elements must be carried on hand and a certain amount of dismantling and reassembly as well as adjustment of the lathe must generally be performed each time a change in feed rate is to be made. This is not only expensive but, to change from one to another set up is generally tedious, time consuming and subject to error.

SUMMARY OF THE INVENTION

Accordingly, a principal object of the present invention is to provide a quick-change power feed attachment for a lathe or the like apparatus.

Another object is to provide a quick-change power feed attachment which is inexpensive, of simple construction, and contains relatively few parts.

Another object is to provide a quick-change power feed attachment in which the direction of drive may be readily reversed or the drive may be disabled to permit manual feeding.

A further object of the invention is to provide a quick-change power feed attachment which can be quickly and easily attached to or detached from a lathe.

According to the present invention, a quick-change power transmission attachment is provided for a lathe or the like which is self contained and which forms an underlying support for the lathe. The power input is derived from the lathe spindle through a cog belt and pulley drive while the power output to the feed screw for the tool carriage is transmitted through a similar cog belt and pulley drive, thus facilitating assembly of the unit onto the lathe and obviating the necessity for precise positioning of the attachment relative to the lathe.

According to a more basic aspect of the invention, the variable speed gear transmission elements comprise unique inexpensive face gear and mating cog gear combinations. Certain of the face gears incorporate a plurality of rows of toothed socket elements, any row of which can be meshed with the cooperating cog gear by first moving the face gear out of mesh and then shifting the cog gear into alignment with the selected row, after which the face gear is returned to mesh.

BRIEF DESCRIPTION OF THE DRAWINGS

The manner in which the above and other objects of the invention are accomplished will be readily understood on reference to the following specification when read in conjunction with the accompanying drawings, wherein:

FIG. 3 is a sectional plan view of the power feed attachment and is taken along line 3—3 of FIG. 1.

FIG. 4 is a sectional elevation view taken along the line 4—4 of FIG. 3.

DETAILED DESCRIPTION OF THE PREFERRED EMBODIMENT

Figure 1:
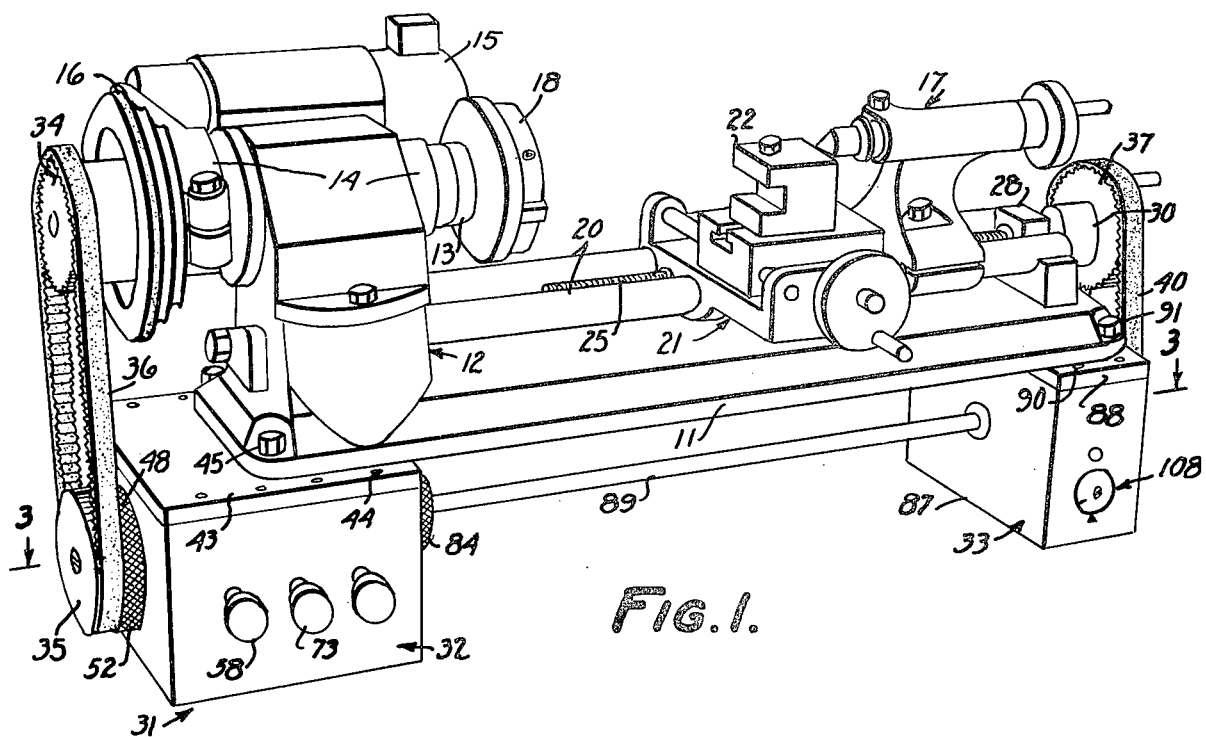
FIG. 1 is a perspective view of a lathe and power feed attachment thereto embodying a preferred form of the present invention.
Figure 2:
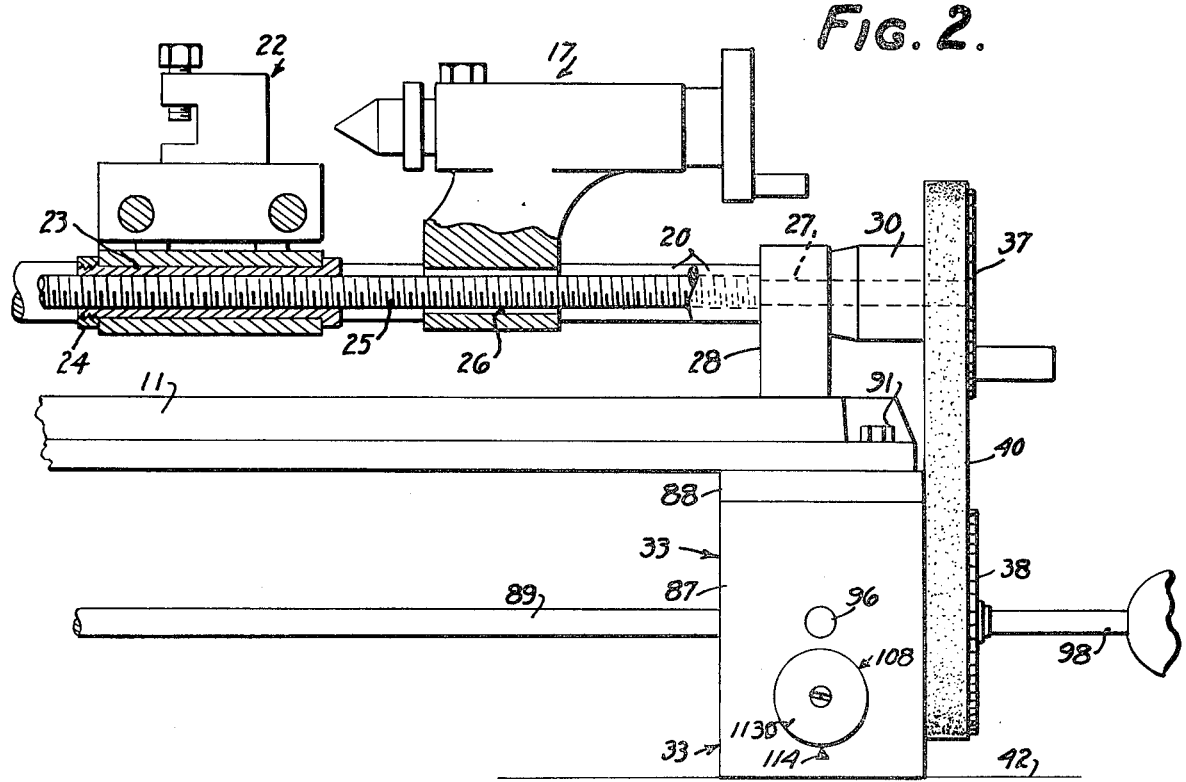
FIG. 2 is a side view, partly broken away and partly in section, of the combined lathe and power feed attachment of the present invention.

Referring particularly to FIGS. 1 and 2, the lathe shown therein is typical of the type of lathe to which the power feed attachment of the present invention may be applied. The lathe comprises a frame bed 11 which supports a headstock 12 at one end. A hollow spindle 13 is rotatably mounted in bearings 14 carried by the headstock and is driven by a motor 15 through a belt and pulley drive partly shown at 16. A chuck 18 or other workpiece supporting device is mounted on the spindle 13 to support a workpiece, not shown, or it may cooperate with a tailstock 17 for supporting such workpiece therebetween. The tailstock 17 is fixedly mounted upon a pair of parallel support rods 20 attached at opposite ends to the opposite ends of the frame bed 11. A cutting tool carriage 21 is mounted on the rods 20 for sliding movement therealong and carries a tool holder 22 for supporting a suitable cutting tool, not shown, to apply a cutting action on the rotating workpiece.

A bushing 23 is fitted in a horizontally extending opening in the carriage 21 and is removably secured in the opening by a nut 24 screwthreaded on the left hand end of the bushing. The bushing 23 is threadably connected to a feed screw 25 which passes through an enlarged opening 26 in the tailstock 17 and has a reduced bearing portion 27 journalled in a bearing formed in a bracket 28 forming part of the bed 11. A hand wheel 30 is secured to the right hand end of the screw shaft 25 to enable manual rotation of the shaft to feed the carriage 21 along the length of the workpiece.

According to the present invention, a quick-change variable speed power transmission attachment generally indicated at 31 is secured to the bottom of the lathe bed 11 to form a support for the lathe and to transmit rotation between the lathe spindle 13 and the feed screw 25 at different preselected ratios. The attachment 31 comprises, generally, a change speed unit 32, a reverse and disengaging unit 33, a power inpput comprising a toothed pulley 34 attached to the spindle 13, a toothed pulley 35 and an endless toothed belt 36 extending over the pulleys, and a power output comprising a toothed pulley 37 forming part of the hand wheel 30, a toothed pulley 38 and a toothed belt 40 extending over both the latter pulleys.

Referring now particularly to FIGS. 3 and 4, the change speed unit 32 is contained mainly within a housing 41 arranged to be suitably secured on a supporting surface 42. The housing is sealed against entrance of dirt, etc., by a cover plate 43 secured thereon by screws 44. The plate 43, in turn, forms a support for the left hand end of the lathe bed 11 to which the bed is suitably secured by bolts, one of which is shown at 45 (FIG. 1).

The aforementioned power inut pulley 35 is keyed to a shaft 46 on which a female face gear 47 is fixed. The shaft 46 is rotatably mounted in a bearing bushing 48 which is screw threaded at 50 concentrically of shaft 46 in the wall 51 of the housing 41 and has a knurled knob portion 52 located exteriorally of the housing 41 to enable manual rotation of the bushing 48 to screw or unscrew the bushing, and therefore the face gear 47, axially a limited amount for a purpose to be described presently.

The face gear 47 is illustrated in meshing relation with a male cog or spur gear 53 secured on a shaft 54 which is both rotatably and slidably mounted in bearings formed in front and rear walls 55 and 56, respectively, of the housing 41.

Figure 5:
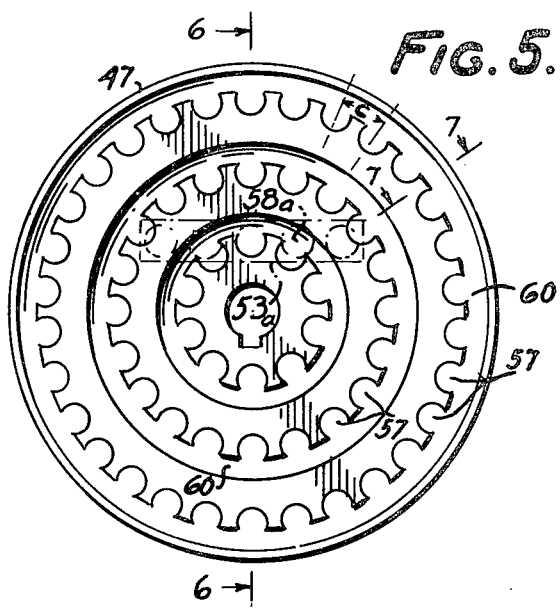
FIG. 5 is an enlarged view of one of the face gears and is taken along the line 5—5 of FIG. 3.
Figure 6:
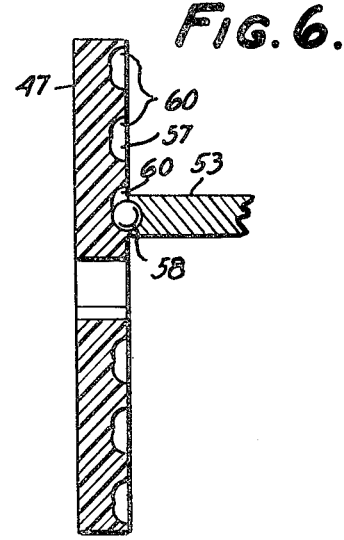
FIG. 6 is a transverse sectional view of the face gear and is taken along the line 6—6 of FIG. 5.
Figure 7:
FIG. 7 is a fragmentary sectional view through part of the face gear and is taken along line 7—7 of FIG. 5.
Figure 8:
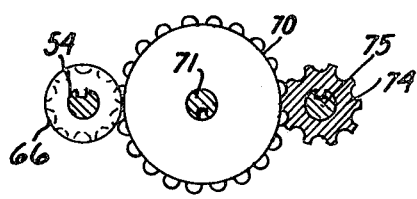
FIG. 8 is a sectional view through part of the gearing and is taken along line 8—8 of FIG. 3.

Describing now the construction of the face gear 47 and cog gear 53, reference is had particularly to FIGS. 5 to 7 wherein it will be seen that the gear 47, which is preferably molded of plastic, has three concentric rows of spaced semisperical tooth sockets 57 formed therein to mesh with spaced semi-spherical tooth projections 58 carried by the cog gear 53. The projections 58 are formed by spherical elements which are partially embedded within the outer periphery of the gear 53 and are welded or otherwise secured therein.

It will be noted that the circular pitch "c", i.e., the distance measured along the pitch circle from the center of one socket to that of an adjacent socket, is equal in all three rows and this distance is equal to the circular pitch of the projections 58 on the cog gear 53. Thus, the cog gear 53 may be shifted axially into proper meshing relation with the sockets 57 of any of the three concentric rows on the face gear to provide for transmission of movement between the gears at three different ratios, there obviously being different numbers of tooth sockets 57 in the different rows. In the example shown, the face gear contains 10 sockets in the inner row, 20 in the center row and 30 in the outer row. However, in order to prevent interference between the projections 58 and the land portions surrounding the sockets 57 of any of the rows during meshing and demeshing of the projections with the sockets 53, annular clearance grooves 60 are formed in the face gear around the several rows of sockets. The sockets open radially outwardly into such clearance grooves 60 so that as each projection 58 moves tangentially into meshing engagement with a socket 57, it first passes into the clearance groove as will readily be seen by dot-dash-lines 52a and 58a, FIG. 5, resulting in a smooth transmission of movement between the gears.

In order to mesh the cog gear 53 with a selected one of the rows of tooth sockets 57, the bushing 58 is unscrewed a slight distance, carrying with it the gear 47, until the latter demeshes from the gear 53. A knob 58 on shaft 54 is then grasped to shift the shaft and gear 53 axially into alignment with the selected row of tooth sockets. In order to indicate the particular row of sockets with which the gear 53 is aligned, spaced colored bands 60 are formed on the shaft 54. By noting the location of such bands relative to the front housing wall 55, the setting of the gear 53 will be indicated. Thereafter, the bushing 48 is screwed back into the wall 51, returning and locking the face gear 47 laterally into mesh with the gear 53.

Figure 11:
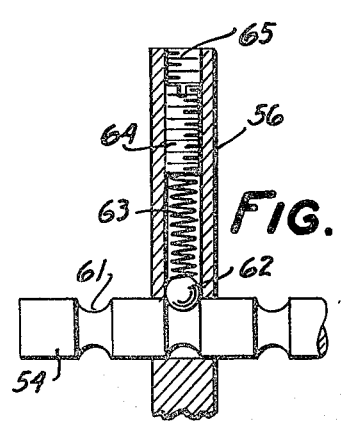
FIG. 11 is an enlarged fragmentary sectional view through a typical spring detent for locating one of the gear shifts in selected position and is taken along line 11—11 of FIG. 3.

In order to locate and hold the gear 53 in proper meshing engagement with a selected row of sockets 57 spaced circumferentially extending detent grooves 61 are formed in the shaft 54 to be engaged by a detent ball 62, FIG. 11, which is yieldably urged against the shaft by a compression spring 63 interposed under a set screw 64 threaded within a hole 65 formed in the wall 56.

A second but female cog gear 66 is slidably keyed on the shaft 54 and is located against axial movement by a pair of stationary guide fingers 67 and 68 extending upwardly from the bottom wall of the housing 41 and engaging the opposite ends of the gear 66. Gear 66 meshes with a relatively large male cog gear 70, fixed to a second shaft 71 which is rotatably and slidably mounted in bearings formed in the front and rear walls 55 and 56, respectively of the housing 41. The gear 70 has spaced semi-spherical projections similar to projections 58 which mesh with sockets 69 of gear 66, the sockets 69, however, extending along the length of gear 66.

Shaft 71 is similar to shaft 54 but is shiftable into two axial positions only by means of a knob 73 at the forward end thereof. A detent device, not shown, but similar to that disclosed in FIG. 11, is provided to locate the shaft in either of such two positions.

In the rear, full line illustrated position of the shaft 71, the cog wheel 70 lies out of meshing engagement with a female cog wheel 74 which is slidably keyed on a third shaft 75 but is prevented from axial movement by stationary guide fingers 76 extending over the opposite ends thereof. On the other hand, in such position of the shaft 71, a relatively small male cog gear 78 fixed on shaft 71 extends in meshing engagement with a relatively large female cog gear 80 which is slidably keyed on the shaft 75 and prevented from axial movement by stationary guide fingers 81. In the embodiment shown, the gears 70 and 80 are twice the diameter of the cooperating gears 77 and 78.

When the shaft 71 is shifted into its forward alternate position, gear 70 moves into mesh with gear 74 and gear 78 moves out of mesh with gear 80.

A male cog gear 82, similar to cog gear 53, is fixed on shaft 75 and is arranged to mesh with a female face gear 83, similar to face gear 47. Gear 83 is fixed on a shaft 89 which extends coaxially of shaft 46 and is rotatably mounted at its left hand end in a bushing 84 screw threaded at 85 into the right hand wall 86 of the housing 41.

The shaft 75 may be shifted into any of three axial positions of align the gear 82 with any of three concentric rows of toothed sockets in face gear 83 and the bushing 84 may be manually unscrewed in a manner similar to bushing 48 to demesh the face gear 83 from gear 82 to enable selective positioning of the gear 82 as desired. Thereafter, the bushing is returned to lock the gears 82 and 83 in mesh. Detenting means, similar to that described in connection with shaft 54, is provided to locate the shaft 85 in any of its three positions.

Describing now the reverse and disengaging unit 33, the latter is housed mainly in a housing 87 which rests upon the supporting surface 42 and is sealed by a cover plate 88 secured thereon by screws 90. The plate 88, in turn, forms a support for the right hand end of the lathe bed 11 which is secured thereto by bolts, one of which is shown at 91, FIGS. 1 and 2.

The right hand end of shaft 89 is journaled in a ball bearing 92 mounted in the left hand wall of housing 87 and has slidably keyed thereon a plastic female face gear 93 similar to gears 47 and 83 but having only one circular row of socket teeth 94 formed in the right hand face thereof. Gear 94 is in continual mesh with mal cog gear 95 which is slidably keyed on a shaft 96 but held against axial movement by stationary guide fingers 97 engaging opposite ends thereof.

The shaft 96 is mounted for rotational and axial movement in bearings formed in the front and rear walls of the housing 87 and is adapted to be shifted endwise into any of three positions by a handle 98 pivoted at 99 in a slot 100 formed in the right hand wall of the housing 87. The left hand end of the handle 98 fits within a circumferential slot 101 formed in a bushing 102 secured to the shaft 96.

Two plastic female face gears 103 and 104, each having a single circular row of socket teeth formed in the face thereof, are fixed on the shaft 96 on opposite sides of a male cog gear 105. When the shaft 96 is in its neutral position illustrated in FIG. 3, both face gears 103 and 104 are out of mesh with the gear 105 and, therefore, can not transmit rotation thereto. However, when the handle 98 is rocked clockwise into its alternate position shown by dot-dash-lines 98a, the shaft 96 is moved rearwardly to mesh the face gear 103 with cog gear 105 to rotate the same in one direction, and when the handle is moved counterclockwise into its alternate position 98b, the shaft 96 is shifted axially to mesh the gear 104 with cog gear 105 to rotate the latter in an opposite direction. Suitable detenting devices, similar to that shown in FIG. 11 are mounted in the front and rear walls of the housing 87 to locate the shaft 96 in any of its three different positions.

Cog gear 105 is fixed on a shaft 106 journaled in a ball bearing 107 supported by the housing wall. The shaft 106 carries at its outer end the aforementioned toothed pulley 38 for driving belt 40.

Figure 10:
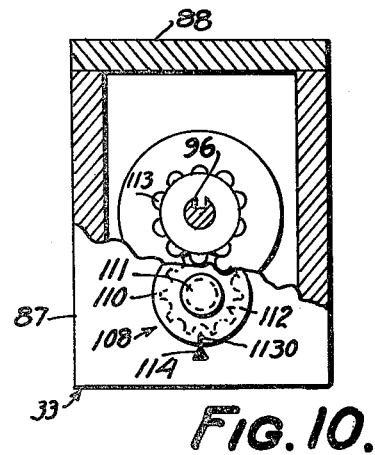
FIG. 10 is a sectional view, partly in exterior, showing the screw threading dial and is taken generally along the line 10—10 of FIG. 3.
Figure 9:
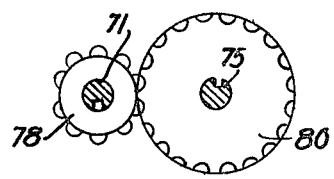
FIG. 9 is a sectional view through another part of the gearing and is taken along the line 9—9 of FIG. 3.

A screw threading dial device generally indicated at 108, FIGS. 1, 2 and 10, is provided to indicate the proper meshing engagement of one or the other of the face gears 103 and 104 with the cog gear 105 during screw thread cutting operations of the workpiece. The device comprises a dial 110 mounted on a shaft 111 journaled in the front wall of the housing 87 and carrying a female cog gear 112 which meshes, only when the shaft 96 is in its illustrated neutral position, with a male cog gear 113 fixed on the shaft 96 and having the same diameter as gear 112. One or more timing marks 113a are formed on the dial 110 to indicate, when moving past a stationary index mark 114 on the wall of the housing 87, the proper instant for operating the handle 98 to mesh one or the other of the face gears 103 and 104 with cog gear 105.

Describing now the adjustment of the variable speed transmission unit 32, the centrally located 71, FIGS. 3 and 4, is generally set in its illustrated rear position for general cutting operations, resulting in a relatively fine pitch movement of the carriage 21, or in its alternate forward position for thread cutting, resulting in a relatively coarse pitch movement of the carriage. The amount of such fine or coarse pitch movement, however, is determined by the differential positioning of the outer shafts 54 and 75. When the shaft 71 is set in its illustrated rear position, power is transmitted from spindle 13 through pulley 35 and the train of gears 47, 53, 66, 70, 78, 80, 82 and 83 to drive the shaft 89 in one direction. However, for screw cutting purposes, the shaft 71 is shifted into its forward position, and in this condition power is transmitted through pulley 35 and the train of gears 47, 53, 66, 70, 74, 82 and 83 to drive the shaft in the same direction but at a higher rate of speed relative to the speed of the spindle 13.

Differential setting of the shafts 54 and 75 also changes the overall gear ratio to change the pitch movement of the carriage within the broad ranges that are determined by the setting of the shaft 71. For example, with the gear ratios set forth hereinbefore, and with the feed screw 25 having a pitch of 18 threads per inch, the following chart illustrates the pitch movement of the carriage, i.e., the advance during each revolution of the spindle 13 or the number of threads cut per inch, with different settings of the shafts 54, 71 and 75.

(R) = rear position of shaft.
(C) = central position of shaft.
(F) = forward position of shaft.
(1) Shaft 54 (R), shaft 71 (R), shaft 75 (R): feed = 0.014 in. per rev.
(2) Shaft 54 (R), shaft 71 (R), shaft 75 (R): feed = 0.020 in. per rev.
(3) Shaft 54 (R), shaft 71 (R), shaft 75 (F): feed = 0.039 in. per rev.
(4) Shaft 54 (C), shaft 71 (R), shaft 75 (R): feed = 0.009 in. per rev.
(5) Shaft 54 (C), shaft 71 (R), shaft 75 (C): feed = 0.014 in. per rev.
(6) Shaft 54 (C), shaft 71 (R), shaft 75 (F): feed = 0.028 in. per rev.
(7) Shaft 54 (F), shaft 71 (R), shaft 75 (R): feed = 0.004 in. per rev.
(8) Shaft 54 (F), shaft 71 (R), shaft 75 (C): feed = 0.007 in. per rev.
(9) Shaft 54 (F), shaft 71 (R), shaft 75 (F): feed = 0.014 in. per rev.
(10) Shaft 54 (R), shaft 71 (F), shaft 75 (R): feed = 18 threads per inch.
(11) Shaft 54 (R), shaft 71 (F), shaft 75 (C): feed = 12 threads per inch.
(12) Shaft 54 (R), shaft 71 (C), shaft 75 (F): feed = 8 threads per inch.
(13) Shaft 54 (C), shaft 71 (F), shaft 75 (R): feed = 27 threads per inch.
(14) Shaft 54 (C), shaft 71 (F), shaft 75 (C): feed = 18 threads per inch.
(15) Shaft 54 (C), shaft 71 (F), shaft 75 (F): feed = 9 threads per inch.
(16) Shaft 54 (F), shaft 71 (F), shaft 75 (R): feed = 54 threads per inch.
(17) Shaft 54 (F), shaft 71 (F), shaft 75 (C): feed = 36 threads per inch.
(18) Shaft 54 (F), shaft 71 (F), shaft 75 (F): feed = 18 threads per inch.

It will be obvious to those skilled in the art that many variations may be made in the exact construction shown without departing from the spirit of this invention. For example, by substituting a feed screw 25 of different pitch, a different combination of selectable feed rates can be provided.

I claim:

1. A power transmission apparatus comprising a power input member,
   a power output member,
   a face gear operatively connected to one of said members,
   means supporting said face gear for rotation about a first axis,
   said face gear having a plurality of circular rows of tooth elements extending concentrically about said axis,
   a circular pitch of said tooth elements being the same,
   a second gear having a circumferential row of tooth elements,
   means operatively connecting said second gear to the other of said members,
   the circular pitch of said tooth elements of said second gear being the same as the circular pitch of said tooth elements of said face gear,
   means for moving said second gear endwise to align said tooth elements thereof with any of said circular rows of tooth elements of said face gear, and
   means for moving said face gear endwise to mesh an aligned row of said tooth elements thereof with said tooth elements of said second gear.

2. A power transmission apparatus as defined in claim 1 wherein said tooth elements of each of said rows of said face gear comprise semi-spherical sockets, and said tooth elements of said second gear comprise semi-spherical projections engagable with said sockets.

3. A power transmission apparatus as defined in claim 2 comprising circular grooves in said face gear concentric with respective ones of said rows of sockets, said sockets opening radially outwardly into said grooves.

4. A power transmission apparatus as defined in claim 1 wherein said face gear is operatively connected to said power input member and said second gear is operatively connected to said power output member.

5. A power transmission apparatus as defined in claim 1 wherein said face gear is operatively connected to said power output gear and said second gear is operatively connected to said power input member.

6. A power transmission apparatus as defined in claim 1 wherein said means for moving said face gear endwise comprises a bearing member rotatably supporting said face gear,
   a stationary member,
   means on said bearing member forming a screw-threaded connection with said stationary member,
   the axis of said screw-threaded connection extending concentrically of the axis of said face gear,
   said bearing member being rotatable whereby to cause said threaded connection to move said bearing axially into and out of mesh with said second gear.

7. A power transmission apparatus as defined in claim 6 wherein said stationary member comprises a housing for said gears,
   said bearing member extending through the wall of said housing and being rotatable from the exterior of said housing.

8. A power transmission apparatus as defined in claim 1 comprising
   a housing for said gears,
   said means for moving said second gear comprising a shaft,
   bearings in certain of the walls of said housing supporting said shaft for rotation and for axial movement, and
   a knob on said shaft exteriorially of said housing for moving said shaft.

9. A power transmission apparatus as defined in claim 8 comprising
   means on said shaft for indicating the position of said second gear relative to said face gear.

10. A power transmission apparatus as defined in claim 9 comprising yieldable detent means for detenting said second gear in alignment with any of said circular rows of elements on said face gear.

11. A power transmission apparatus as defined in claim 1 wherein said means for operatively connecting said second gear to the other of said members comprises a second face gear,
    means supporting said second face gear for rotation about an axis,
    said second face gear having a plurality of circular rows of tooth elements extending concentrically about said axis thereof,
    the circular pitch of said tooth elements of said second face gear being the same,
    a third gear having a circumferential row of tooth elements,
    means rotatably connecting said third gear to said second gear,
    the circular pitch of said tooth elements of said third gear being the same as the circular pitch of said tooth elements of said second face gear,
    means for moving said third gear endwise to align with any of said circular rows of tooth elements of said second face gear, and
    means for moving said second face gear endwise to mesh an aligned row of said tooth elements thereof with said tooth elements of said third gear.

12. A power transmission apparatus as defined in claim 11 wherein said first mentioned face gear and said second face gear are coaxial.

13. A power transmission apparatus comprising
    a power input member,
    a power output member,
    a shaft,
    a pair of spaced coaxially aligned face gears on said shaft,
    means supporting said shaft for rotation and axial movement,
    means rotatably connecting said shaft to one of said power members,
    said gears having circular rows of spaced semi-spherical sockets therein,
    a third gear having a circumferential row of spaced semi-spherical projections therearound,
    means rotatably connecting said third gear to the other of said power members,
    the circular pitch of said projections being the same as the circular pitch of said sockets, and
    means for moving said shaft axially into one position wherein said projections of said third gear mesh with said sockets of one of said face gears and for moving said shaft axially into a second position wherein the projections of said third gear mesh with sockets of the other of said face gears.

14. A power transmission apparatus as defined in claim 13 wherein said moving means is effective to move said shaft into a third position wherein said projections of said third gear are out of mesh with the sockets of both of said face gears.

15. A power transmission comprising a first rotatable gear having spaced semi-spherical elements thereon and a second rotatable gear having spaced tooth sockets of semi-circular cross-section in at least one direction therein positioned for meshing relation with said tooth elements, one of the gears being a face gear, means supporting said face gear for rotation about a first axis, and means supporting the other of said gears for rotation about a second axis at right angles to said first axis.

* * * * *